United States Patent Office 3,313,141
Patented Apr. 11, 1967

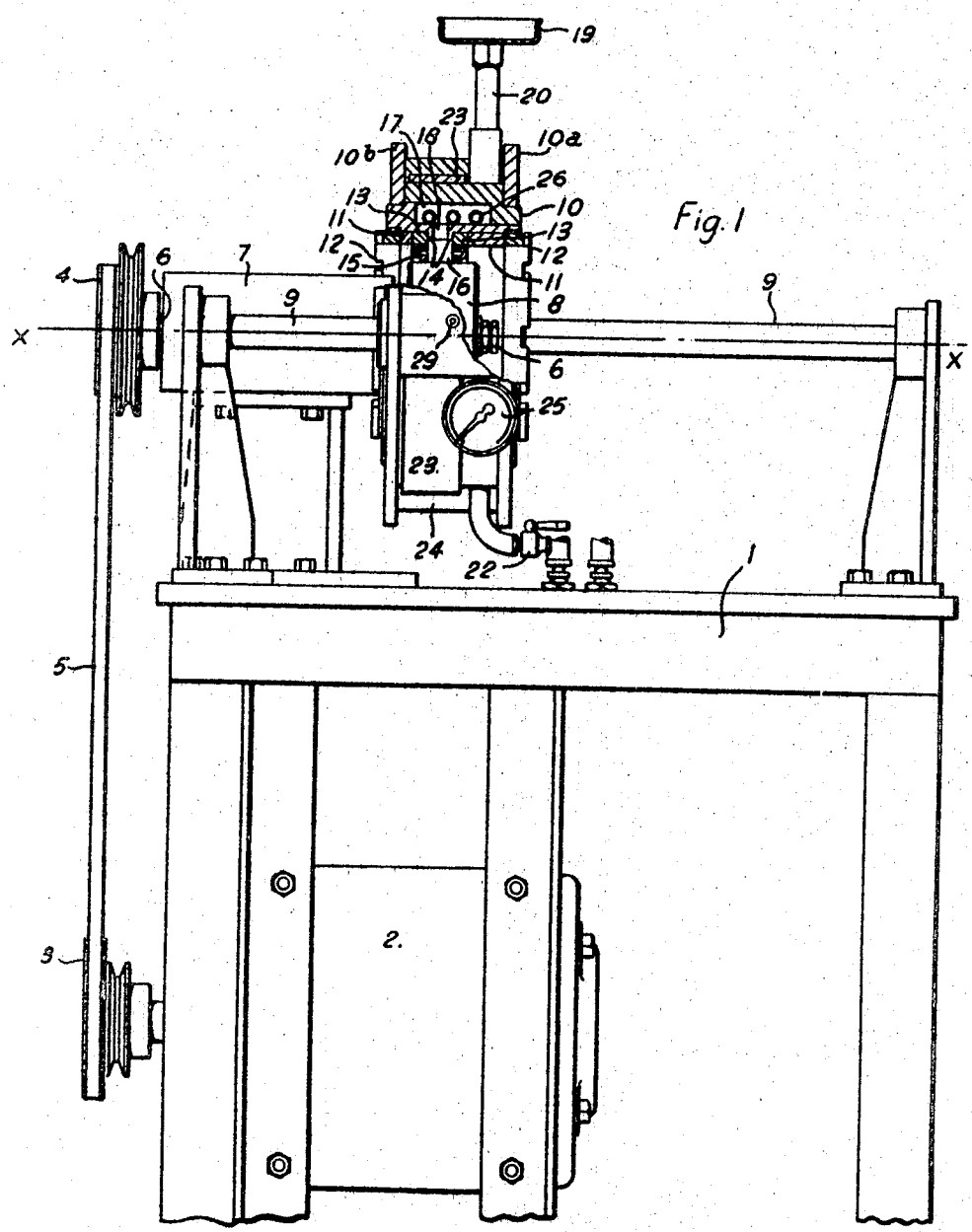

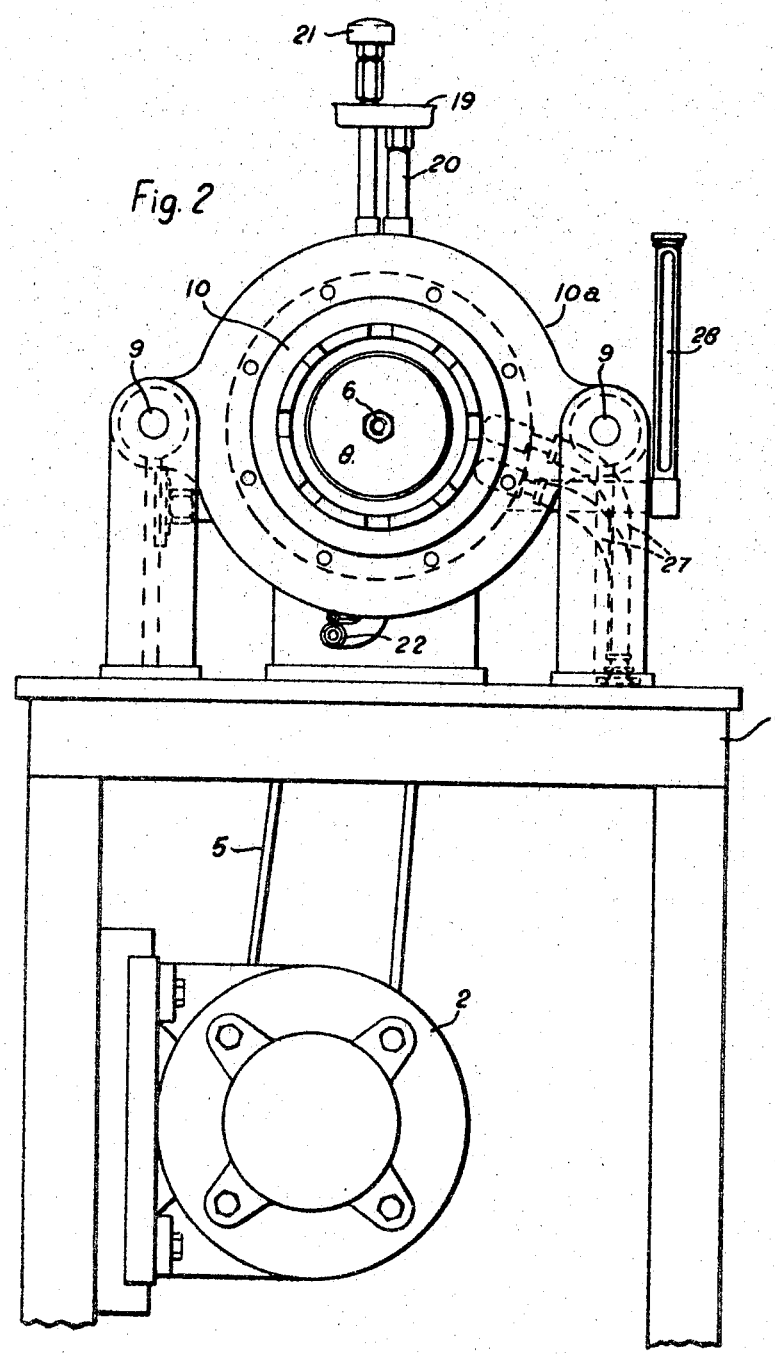

3,313,141
SHAFT SEAL TESTING APPARATUS
Ernest T. Jagger, Geoffrey W. Halliday, and Victor W. English, all of Newcastle-upon-Tyne, England, assignors to George Angus & Company Limited, Newcastle-upon-Tyne, England
Filed May 4, 1964, Ser. No. 364,650
Claims priority, application Great Britain, May 15, 1963, 19,257/63
5 Claims. (Cl. 73—9)

This invention relates to apparatus for testing shaft seals which are rings of rubber, leather or other similarly flexible or adaptable material placed around shafts to prevent leakage of oil or other fluid along the shafts and the ingress of dirt or moisture. Such shaft seals are also known as oil seals.

The shafts on which the seals are used are usually rotary shafts but reciprocating shafts may be sealed by such rings.

Usually the seals are mounted in housings, through which the shafts extend, so that the seals are stationary and their inner peripheries bear against the shafts, the seals then being known as internal seals. Seals may however be mounted on shafts to move therewith, their outer peripheries bearing against surrounding housing or other cylindrical surfaces, and the seals are then known as external seals.

The simplest shaft seals are circular rings of circular cross-section and are called O-rings.

Most other shaft seals are of the lip type, being of channel or other cross-section providing an axial flange as a flexible lip with a peripheral sealing edge to bear against the relatively movable surface to be sealed and often having a garter spring to load the sealing lip against the surface on which it bears.

The present invention provides improved apparatus for testing shaft seals in the course of production, as a quality control step, or in the development of new types of seals, to assess their efficiency.

The invention is applied to shaft seal testing apparatus of a known kind, hereinafter called "the kind defined," which comprises a cylindrical mounting for an opposed pair of shaft seals, the mounting having an annular oil chamber opening between the seals, a cylindrical surface member for the seals to bear against, means for driving the surface member in simulation of shaft movement and a mounting support permitting axial separation of the mounting and surface member for the purpose of installing and removing seals.

For testing internal seals, the mounting is an annular drum with its inner periphery providing a housing for the opposed pair of seals, the cylindrical surface member is a driven stub shaft and the mounting support is a pair of slideways on which the mounting drum can be moved axially to and from a position surrounding the stub shaft.

To use the apparatus, a pair of seals is mounted in place and brought to bear on the stub shaft, or other cylindrical surface member, which is then driven under conditions corresponding to operating conditions for the seals. The seals may thus be tested for wear and by observing, directly or indirectly, any leakage of oil past the seals.

Operating conditions for the seals may be reproduced by controlling the speed and, if desired, the axial alignment or stability of the stub shaft, or other cylindrical surface member, and controlling the temperature and pressure at which the oil is supplied.

Experience with such apparatus has shown that, using testing oil at temperatures of 50° C. or more, differential thermal dimensional change, as between the seal mounting, with its heated oil chamber, and the mounting support and stub shaft bearings, produces misalignment between the seals and the stub shaft and introduces errors or unwanted factors in the test conditions.

The above difficulty is overcome by the present invention according to which, in shaft seal testing apparatus of the kind defined, the mounting support consists of a pair of slide bars extending parallel to the axis of the cylindrical mounting for the pair of shaft seals, the slide bars being arranged symmetrically on opposite sides of and substantially co-planar with the axis of the cylindrical mounting.

Usually the axis of the cylindrical mounting is horizontal and in such case the slide bars are preferably arranged substantially in the horizontal plane of such axis.

With the above arrangement, thermal dimensional change in the cylindrical mounting, due to the heat of the oil in its annular chamber, takes place symmetrically with respect to the slide bars. Therefore the axis of the mounting remains substantially constant with respect to the slide bars so that alignment is maintained. The slide bars and the stub shaft bearings are fixed on a base in common and are relatively unaffected by the heat of the oil in the chamber so that they constitute a substantially constant datum for the axis.

A useful subsidiary feature of the invention is that the slide bars are made of such a diameter and length that they can flex slightly to accommodate thermal change in the diameter of the cylindrical mounting which might otherwise cause the cylindrical mounting to bind against sliding.

According to a further feature of the invention, the cylindrical mounting is provided with an electrical resistance heater surrounding the annular oil chamber and itself externally thermally insulated.

Such a heater effects uniform heating of the oil chamber and thus uniform heating of the cylindrical mounting as well as uniform heating of the oil. Intense local heating of oil, which otherwise could deleteriously affect the oil and hence the seals, is thereby avoided.

The electrical heater is controlled by a thermostat immersed in the test oil in the oil chamber.

Although oil is usually employed for testing shaft seals, it will be understood that other fluid could be used and that references to oil in this specification are intended to include similar reference to other suitable fluid.

An apparatus for testing internal seals on a rotary stub shaft is shown, by way of example, on the accompanying drawings, in which:

FIG. 1 is a side elevation, partly in section, and
FIG. 2 is an end elevation.

The apparatus shown comprises a stand 1 with an electric motor 2 driving, through pulleys 3 and 4 and a belt 5, a spindle 6 in a pedestal bearing 7.

On the spindle 6 there is mounted a stub shaft 8, of the same diameter as a shaft to be sealed by seals to be tested. The mounting of the stub shaft 8 on the spindle 6 could, if desired, be such that the stub shaft is slightly eccentric or misaligned with the spindle 6 so as to stimulate such conditions which the seals might encounter in use.

On a pair of slide bars 9 on the stand 1 there is mounted, by flange plates 10a and 10b, an annular drum 10 which can be moved along the bars 9 between the position shown in FIG. 1, in which it surrounds the stub shaft 8, and a position, clear of the stub shaft 8, in which the inner periphery of the drum 10 is easily accessible.

It will be noted that the slide bars 9 are symmetrically arranged, diametrically opposite, parallel to and horizontally co-planar with the axis X—X of the drum 10 which is coaxial with the spindle 6 and stub shaft 8.

On the inner periphery of the drum 10, spacing rings 11 and screw-threaded locking rings 12 are provided to hold a pair of seal-housing rings 13 spaced a short distance apart by abutment against shoulders 14 on the inner periphery of the drum 10.

In the housing rings 13, a pair of seals 15 are mounted, each as an interference press fit in its housing ring in the same way as such seals are mounted in use.

The seals 15 are axially opposed so as to seal the space 16 between them by bearing on the cylindrical surface of the stub shaft 8.

The interior of the drum 10 forms a chamber 17, with ports 18 opening into the space 16 between the seals. The chamber 17 can be filled with oil through a dish funnel 19 and stand pipe 20 to provide a suitable static fluid head in the chamber for which a breather tube 21 (FIG. 2) provides a vent. A drain tube with a cock 22 is provided for drawing off oil from the chamber 17.

For heating the oil in the chamber 17, an electrical resistance heater band 23, in one or more units, is strapped around the drum 10 and is heavily thermally insulated from the atmosphere by a jacket 24. The heater 23 uniformly heats the cylindrical wall of the drum 10 and this wall provides a relatively large transfer surface for uniform heating of the oil in the chamber 17. The heater 23 is controlled by a thermostat (not shown) in the chamber 17 and a temperature indicator 25, the position of which may be varied, is also provided.

For cooling the oil, a cooling water circulating coil 26 is provided in the chamber 17 and is supplied through flexible pipes 27 (FIG. 2), the latter accommodating sliding of the drum 10 along the slide bars 9.

A gauge 28, for the level of oil in the chamber 17, is also provided as shown in FIG. 2 or at any other position convenient for reading.

The drum 10 and associated parts form the cylindrical mounting for the seals and can be located and locked in test position by a bolt, or set screw 29, engaging one of the slide bars 9.

To test a pair of similar seals 15, they are mounted in the housing rings 13, the drum 10 being empty of oil and moved on the slide bars 9 to clear position, and a stub shaft 8 of appropriate diameter is mounted on the spindle 6. The drum 10 is then moved to bring the seals to bear on the stub shaft 8 and the chamber 17 is filled with oil which is brought to a desired temperature.

The motor 2 is started to rotate the stub shaft 8 at a required speed and for any given period during which the ends of the stub shaft 8 are observed visually for oil leakage. With efficient seals, the amount of any oil leakage will be small but if necessary, in a prolonged test for example, total leakage can be measured by observation of the gauge 28.

The slide bars 9 are made slender enough in relation to their length for them to be capable of flexing slightly to allow for expansion and contraction of the flange plates 10a and 10b, when the drum 10 is heated and cooled, so that sliding of the cylindrical mounting on the slide bars is not impeded by a tendency of the flange plate bearing to bind on the slide bars.

We claim:
1. In a shaft seal testing apparatus comprising a cylindrical mounting for an opposed pair of shaft seals, an annular oil chamber in said mounting and having an opening located to open between said seals, a cylindrical surface member for said seals to bear against, means for driving said surface member in simulation of shaft movement and support means for said mounting permitting axial separation of said mounting and said surface member for installation and removal of said seals; the improvement which consists in said support means comprising a pair of slide bars extending symmetrically parallel to, on opposite sides of and substantially co-planar with the axis of said mounting.

2. Apparatus according to claim 1, in which the axes of said mounting and said slide bars are substantially in the same horizontal plane.

3. Apparatus according to claim 2, in which said slide bars are slightly flexible to accommodate changes in the diameter of the cylindrical mounting.

4. Apparatus according to claim 1, in which said slide bars are slightly flexible to accommodate changes in the diameter of the cylindrical mounting.

5. Apparatus according to claim 1, in which an electrical resistance heater is provided surrounding said annular oil chamber and thermal insulation is provided externally around said heater.

References Cited by the Examiner
UNITED STATES PATENTS

| 3,041,867 | 7/1962 | Knudsen | 73—9 |
| 3,176,497 | 4/1965 | Dega | 73—9 X |
| 3,180,135 | 4/1965 | Cain et al. | 73—9 X |

DAVID SCHONBERG, *Primary Examiner.*